United States Patent [19]

Arnold et al.

[11] Patent Number: 6,072,750
[45] Date of Patent: Jun. 6, 2000

[54] METHOD FOR PRODUCING SEISMIC PULSES

[75] Inventors: Gareth Christopher Arnold, Leicestershire; Stephen William Wood, Croyden, both of United Kingdom

[73] Assignee: BG PLC, Berkshire, United Kingdom

[21] Appl. No.: 08/849,888

[22] PCT Filed: Dec. 21, 1995

[86] PCT No.: PCT/GB95/03003

§ 371 Date: Sep. 17, 1997

§ 102(e) Date: Sep. 17, 1997

[87] PCT Pub. No.: WO96/20413

PCT Pub. Date: Jul. 4, 1996

[30] Foreign Application Priority Data

Dec. 23, 1994 [GB] United Kingdom .................. 9426146

[51] Int. Cl.$^7$ .................................................. G01V 1/137
[52] U.S. Cl. ............................................................ 367/144
[58] Field of Search .............................. 367/144; 181/118, 181/117, 119, 113

[56] References Cited

U.S. PATENT DOCUMENTS

| | | | |
|---|---|---|---|
| 4,667,766 | 5/1987 | Melvin ..................................... | 367/144 |
| 5,091,891 | 2/1992 | Thomas et al. .......................... | 367/144 |
| 5,270,985 | 12/1993 | Thomas et al. .......................... | 367/144 |

*Primary Examiner*—Daniel T. Pihulic
*Attorney, Agent, or Firm*—Larson & Taylor

[57] ABSTRACT

The method involves using an acoustic wave generating apparatus, such as an "air gun", which employs only a single gas or single gas mixture and which has a gas pressurizable chamber with an inlet for permitting pressurized gas to be introduced into the chamber and a closed outlet which can be opened rapidly to release pressurized gas from the chamber into a liquid to generate acoustic wave energy. Hydrogen and/or helium is/are used instead of air as the gas with the result that the strength and quality of the initial pulse of the generated wave energy is improved.

4 Claims, 4 Drawing Sheets

TABLE 1

| Source type | Gas | Pa (bar m) | Pa/Pb | Bp (m sec) | Port area (cm$^2$) | Volume (dm$^3$) |
|---|---|---|---|---|---|---|
| Bolt Air gun | Air | 1.0 | 3.0 | 50 | 12 | 0.3 |
| Bolt Air gun | He | 3.5 | 8.0 | 47 | 12 | 0.3 |
| Sleeve gun | Air | 2.9 | 3.4 | 67 | 25 | 0.7 |
| Sleeve gun | He | 3.9 | 8.5 | 60 | 25 | 0.7 |

Seismic Signal characterisation

Pa = Peak to peak pressure amplitude
Pd = Positive pressure amplitude
Pb = Bubble pulse P-P amplitude
Pg = Reflected ghost pressure amplitude
Tr = Pressure rise time
Tw = Pulse width
Tb = Bubble pulse period

FIG. 4.

TABLE 1

| Source type | Gas | Pa (bar m) | Pa/Pb | Bp (m sec) | Port area (cm²) | Volume (dm³) |
|---|---|---|---|---|---|---|
| Bolt Air gun | Air | 1.0 | 3.0 | 50 | 12 | 0.3 |
| Bolt Air gun | He | 3.5 | 8.0 | 47 | 12 | 0.3 |
| Sleeve gun | Air | 2.9 | 3.4 | 67 | 25 | 0.7 |
| Sleeve gun | He | 3.9 | 8.5 | 60 | 25 | 0.7 |

METHOD FOR PRODUCING SEISMIC PULSES

BACKGROUND OF THE INVENTION

1. Field of the Invention

The present invention relates to a method for producing seismic pulses and, more particularly, to a method for generating acoustic wave energy for use in seismic surveying employing, for example, a seismic gun or seismic source apparatus which conventionally utilises air and is commonly known in this field as an air gun.

2. Related Art

An air gun normally rapidly releases very high pressure air into, for example, water to generate an air bubble and associated acoustic pulse. The acoustic pulse generated in the water then propagates as a wave downwards through the water and, if generated in water offshore, down through the subwater or subsea strata, at the interfaces of which, in sedimentary layers, it is partially reflected back towards the surface. Reflected pulses, detected, for example, by receivers at the surface or in a nearby borehole, can usually be attributed to sedimentary layer structures. Seismic surveys employing this kind of technique are used, for example, in searches for hydrocarbon reserves to delineate the sedimentary structures below a seabed and identify potential structural 'traps' for hydrocarbons.

The quality of an air gun is commonly specified in terms of the strength of the initial pulse (Pa) in bar-meters (the acoustic pressure in bars times the distance from the source in meters) together with the ratio of the strength of the initial pulse to the strength of the maximum bubble peak (Pa/Pb). This is illustrated in somewhat schematic form in FIG. 1.

Having regard to FIG. 1, the larger initial or primary pulse is the important pulse because this provides the initial impulse from which strongest reflections derive. The larger the amplitude the greater the pulse energy and hence the greater the penetration. The smaller subsequent bubble pulses that are generated are a problem because additional pulses complicate the reflection wavefield which must be removed in subsequent processing.

In order to increase both Pa and Pa/Pb, "tuned" arrays of guns are currently used. In the tuned arrays, guns of different volumes are placed at locations calculated to cause cancelling of the bubble pulses but to reinforce the initial or primary pulses.

SUMMARY OF THE INVENTION

An object of the invention is to provide a method for facilitating the generation of seismic pulses having both increased Pa and increased Pa/Pb.

The invention consists in a method of operating acoustic wave generating apparatus which comprises a gas pressurisable chamber having an inlet for permitting a pressurised gas to be introduced into the chamber and a closed outlet which can be opened rapidly to release pressurised gas from the chamber into a liquid to generate acoustic wave energy, wherein the method comprises employing a single gas or gas mixture in the apparatus, the gas being substantially helium or substantially hydrogen, or the gas mixture comprising helium and/or hydrogen to the extent that the gas mixture has a notional molecular weight which is less than air, and introducing such helium, hydrogen or gas mixture under pressure into the chamber and then operating the apparatus to release the pressurised helium, hydrogen or gas mixture through the outlet to generate the acoustic wave energy. For example, the apparatus employed may be a so-called 'Bolt air gun' or a so-called 'sleeve gun' or a 'GI-gas injector gun'.

The invention also consists in a seismic surveying method comprising producing acoustic wave energy in accordance with the method as defined above.

The gas mixture having a notional, average or mean molecular weight less than air may be 90% helium and 10% air.

Alternatively, the gas mixture may be helium and hydrogen.

Preferably, the gas used is helium alone or substantially alone. The use of helium is particularly convenient because it is practically completely inert and readily available in bottled form.

BRIEF DESCRIPTION OF THE DRAWINGS

FIG. 4 is an explanatory table.

DESCRIPTION OF THE PREFERRED EMBODIMENT

Applicants have carried out experiments to investigate the effect of using helium instead of air. In the experiments source signatures were recorded from different seismic or 'air' guns charged with air, on the one hand, and then with helium, on the other hand.

The guns used in the experiments were:

1. A Bolt 600B —20 cubic inch chamber air gun which has four orthogonal ports or outlets out of which pressurised or compressed gas escapes from the gun to generate acoustic wave energy.
2. A HGS (Sleeve gun) 40 cubic inch chamber sleeve gun which has a port or outlet arrangement such that the pressurised gas can escape over an angle of 360° from the gun to generate acoustic wave energy.

All measurements were conducted in water with the gun ports at a depth of 2 meters and with the hydrophone 10 m below the gun ports.

Figure 1:
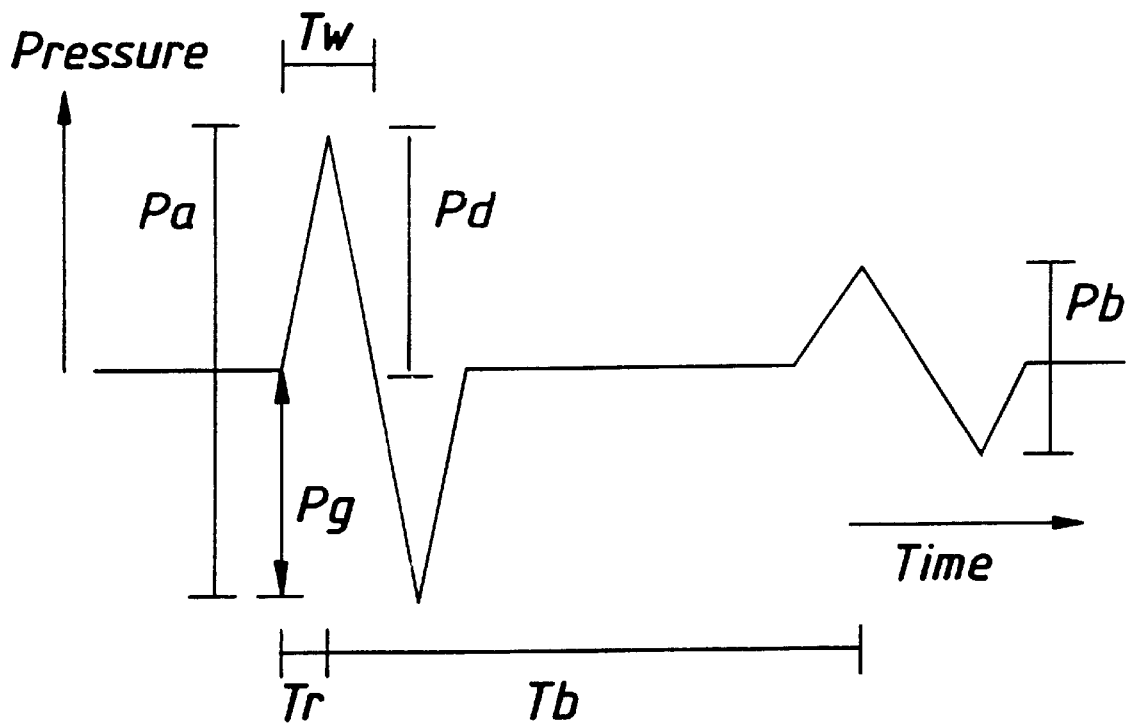
FIG. 1, which was described above, is a schematic representation of a seismic signal illustrating important parameters thereof.
Figure 2A:
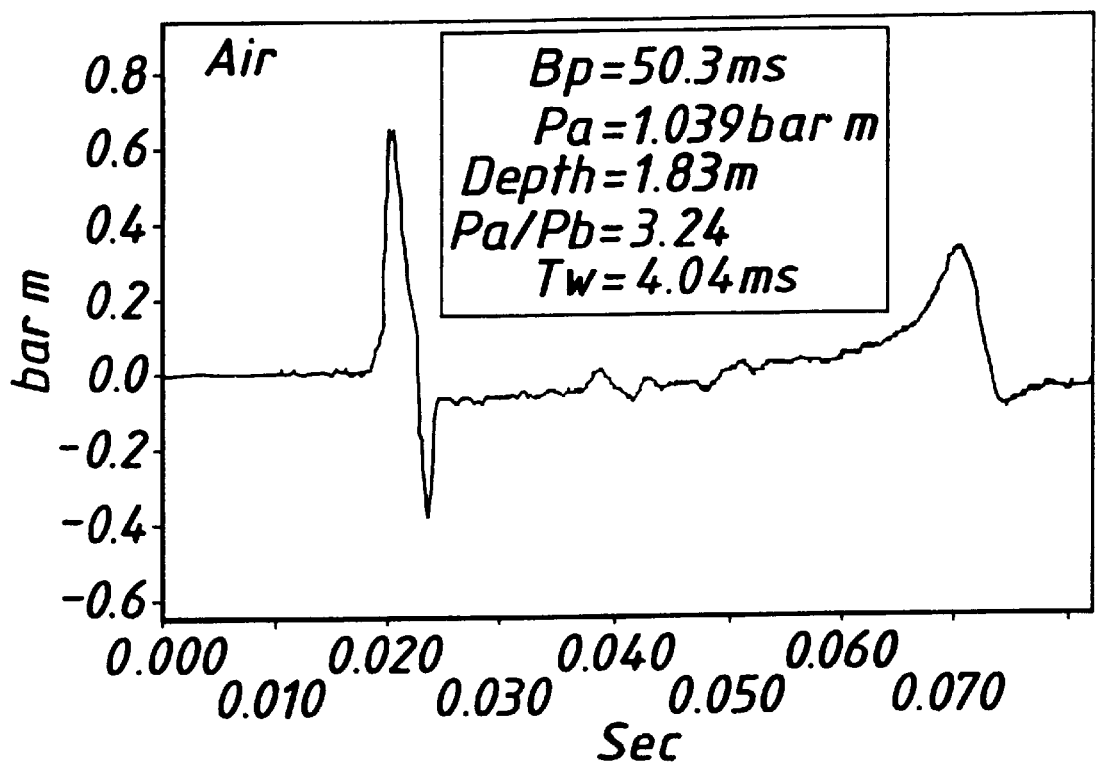
FIGS. 2a and 2b are seismic signatures and related spectra for air and helium, respectively, recorded for the same air gun at the same pressure.
Figure 2B:
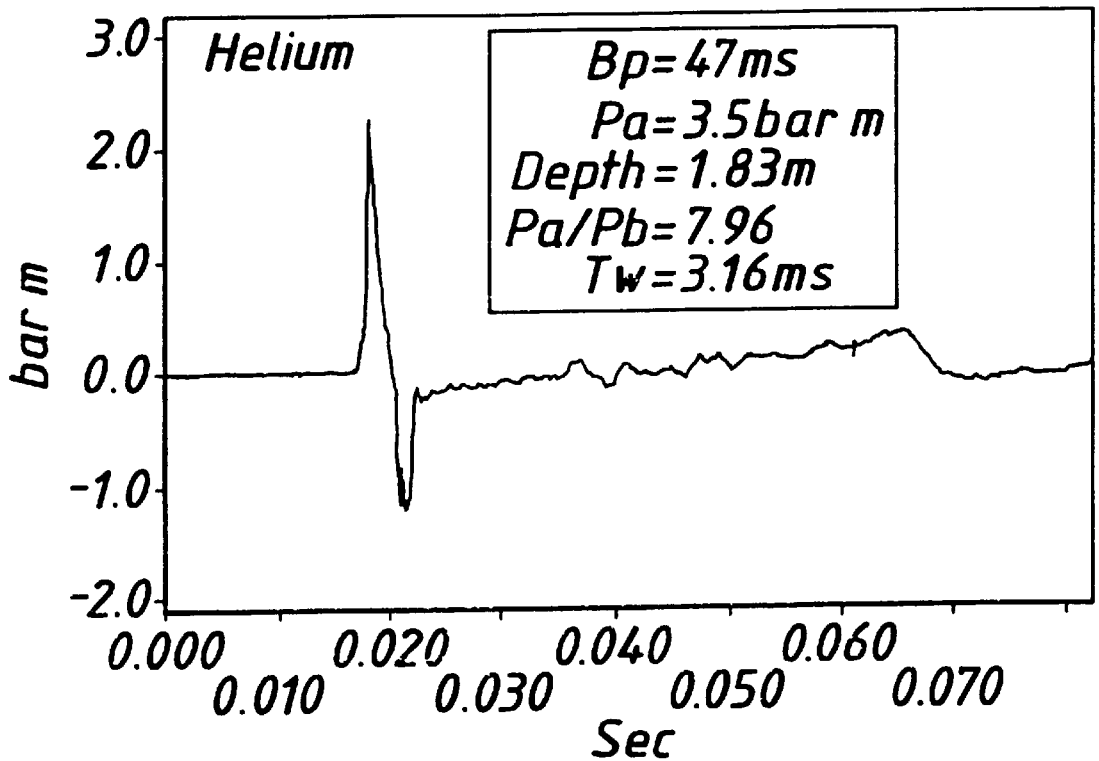

FIGS. 2a and 2b show signatures recorded for the Bolt air gun, using air and helium respectively at 1500 psi. From the Figures it will be seen that the strength (or peak amplitude) of the primary pulse increased almost three fold when helium was used instead of air. Also the bubble pulse was considerably reduced when helium was used; with the result that the bubble pulse ratio (Pa/Pb) was so significantly increased that it is arguable that there was no need to employ 'tuned' arrays that used different volumes of gas. Further, it will be noted that the pulse width Tw is reduced when helium was used (3.16 ms instead of 4.04 ms). This has the effect of introducing higher frequencies into the acoustic pulse and this facilitates improved resolution.

Figure 3A:
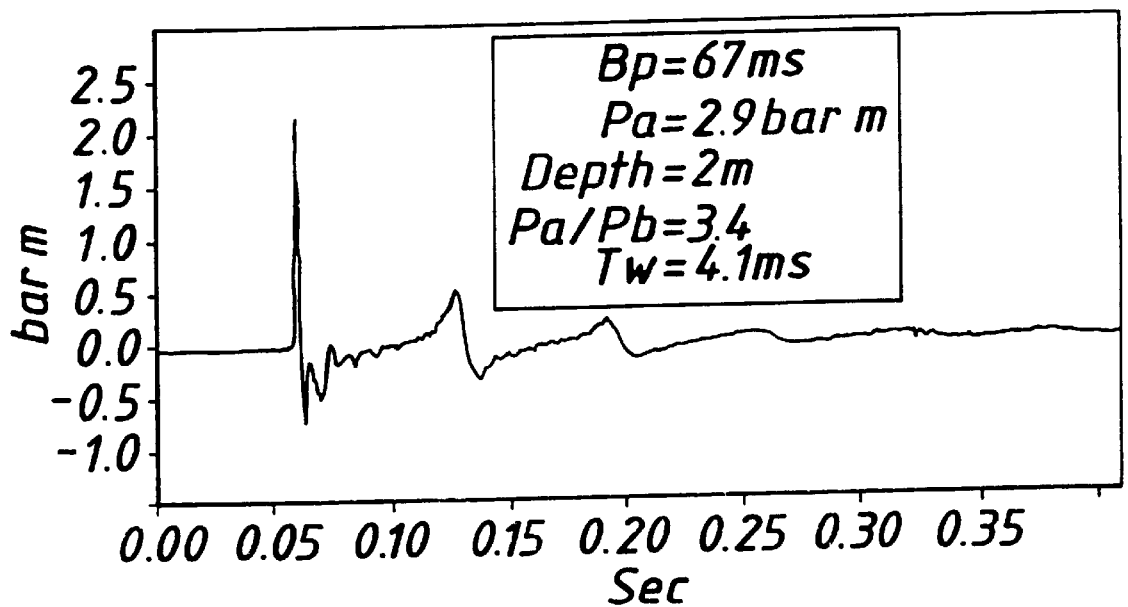
FIGS. 3a and 3b are seismic signatures and related spectra for air and helium, respectively, using a different air gun from that of FIGS. 2a and 2b.
Figure 3B:
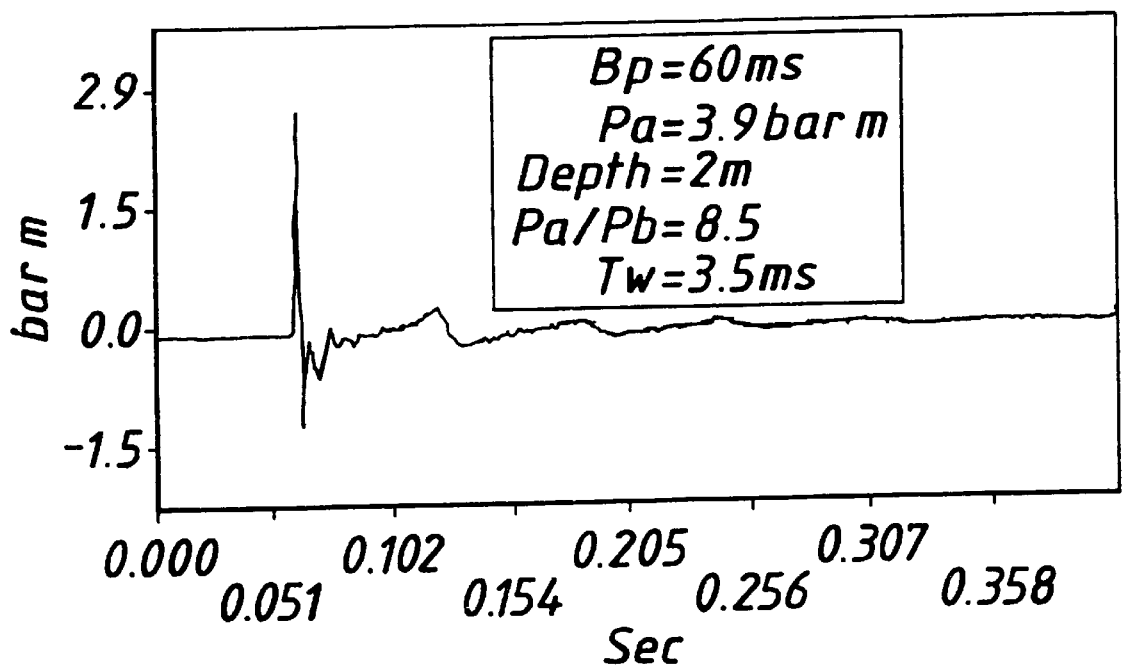

FIGS. 3a and 3b show signatures and their related spectra for the sleeve gun using air and helium respectively at 1700 psi. There was an increase in the strength of the primary pulse from 2.9 bar meter (using air) to 3.9 bar meter (using helium). There was also a large improvement in the bubble pulse ratio (from 3.4 to 8.5) and small decreases in the bubble pulse width and bubble period when the gun was fired using helium instead of air, as reflected in the reduced low frequency oscillations and overall higher amplitude of the helium shot. It will again be noted that the pulse width Tw is reduced when helium was used (3.5 ms instead of 4.1 ms).

The results of the comparative experiments are shown in Table 1 in FIG. 4.

In Table 1, "Bp" refers to the time of the appearance of the first bubble pulse from the moment of firing the gun.

The sleeve guns had larger port sizes than corresponding volume Bolt air guns, giving higher signal strengths and higher frequencies. Sleeve guns are also known for their efficiency in terms of air consumption. Use of helium in sleeve guns offers the possibility of improved performance without excessive gas usage.

Table 1 shows that for comparable tests, primary pulse strength (Pa) significantly increased when helium was used, and also where it was possible to identify a bubble pulse when using air, the bubble pulse strength decreased, the bubble pulse period slightly reduced and the Pa/Pb ratio increased, when using helium. The significant improvement in bubble pulse ratio (Pa/Pb) was particularly satisfying. A Pa/Pb value of 8 is not far from values seen in tuned air gun arrays. Applicants investigations have shown that Pa/Pb values from such arrays may be in the range of about 6 to 12. Applicants recognise that devices do exist to reduce the bubble pulse amplitude produced using standard seismic source apparatus, but Applicants believe that the effect of doing so usually and undesirably reduces the strength of the initial primary pulse, whereas Applicants simple method of using helium has the advantageous effect of increasing it.

Whilst Applicants have carried out the experiments using particular 'Bolt' and sleeve air guns, Applicants believe that the method of the invention can be carried out using a wide range of existing seismic source apparatus or seismic guns.

What is claimed is:

1. A method of operating a single chamber acoustic wave generating apparatus which comprises a single gas pressurisable chamber having an inlet for permitting a pressurised gas to be introduced into the chamber and a closed outlet which can be opened rapidly to release pressurised gas from the chamber into a liquid to generate acoustic wave energy, wherein the method comprises employing a single gas or gas mixture in the apparatus, the gas being substantially helium or substantially hydrogen, or the gas mixture comprising helium and/or hydrogen to the extent that the gas mixture has a notional molecular weight which is less than air, and introducing such helium, hydrogen or gas mixture under pressure into the single chamber and then operating the apparatus to release the pressurised helium, hydrogen or gas mixture through the outlet to generate the acoustic wave energy.

2. A method as claimed in claim 1, where a gas mixture substantially of helium is used.

3. A method as claimed in claim 1, where a gas mixture substantially of helium and hydrogen is used.

4. A seismic surveying method comprising producing acoustic wave energy in accordance with a method as claimed in claim 1.

* * * * *